United States Patent [19]
Hess et al.

[11] Patent Number: 6,077,884
[45] Date of Patent: Jun. 20, 2000

[54] AQUEOUS DISPERSION OF EPOXY RESIN AND BLEND OF EPOXY RESIN-POLYOXYALKYLENE AMINES

[75] Inventors: Michael Hess, Stuttgart; Horst Schneider, Römerstein; Michael Hiller, Löchgau, all of Germany

[73] Assignee: Sika Chemie GmbH, Germany

[21] Appl. No.: 09/101,908

[22] PCT Filed: Nov. 14, 1997

[86] PCT No.: PCT/EP97/06364

§ 371 Date: Sep. 25, 1998

§ 102(e) Date: Sep. 25, 1998

[87] PCT Pub. No.: WO98/25988

PCT Pub. Date: Jun. 18, 1998

[30] Foreign Application Priority Data

Nov. 20, 1996 [DE] Germany .............. 196 47 945

[51] Int. Cl.[7] .............. C08K 3/20; C08L 63/02; C08L 63/04
[52] U.S. Cl. .............. 523/417; 523/414; 528/111
[58] Field of Search .............. 523/414, 417; 528/111

[56] References Cited

U.S. PATENT DOCUMENTS

| | | | |
|---|---|---|---|
| 4,769,438 | 9/1988 | Zimmerman et al. | 528/111 |
| 5,565,505 | 10/1996 | Papalos et al. | 528/111 |
| 5,604,269 | 2/1997 | Papalos et al. | 528/111 |
| 5,874,490 | 2/1999 | Arora et al. | 528/111 |

FOREIGN PATENT DOCUMENTS

| | | |
|---|---|---|
| 511620 | 11/1992 | European Pat. Off. |
| 739367 | 12/1997 | European Pat. Off. |
| 883637 | 12/1998 | European Pat. Off. |
| 883639 | 12/1998 | European Pat. Off. |
| WO 95/01387 | 1/1995 | WIPO |

*Primary Examiner*—Robert E. Sellers
*Attorney, Agent, or Firm*—Pendorf & Cutliff

[57] ABSTRACT

A blend of epoxy-amine adducts are useful as emulsifiers of aqueous epoxy resin dispersions comprises (A-1) one or more epoxy-amine adduct(s) obtained by the reaction of (i) one or more aromatic, cycloaliphatic or novolac epoxy compound(s) and (ii) one or more amine-terminated polyalkylene glycol(s) having a molecular weight of from 700–5000 and an ethyleneoxide content of at least 60% by weight in an equivalent ratio of amine-terminated polyalkylene glycol(s) to epoxy compound(s) of from 0.01:1 to 0.9:1; (A-2) one or more epoxy-amine adduct(s) derived from the reaction of (i) one or more aliphatic epoxy compound(s) and (ii) one or more amine-terminated polyalkylene glycol(s) having a molecular weight of from 700–5000 and an ethyleneoxide content of at least 60% by weight in an equivalent ratio of amine-terminated polyalkylene glycol(s) to epoxy compound(s) of from 0.01:1 to 0.9:1; (B-1) aromatic, cycloaliphatic or novolac polyglycidyl ethers; (B-2) optionally, polyglycidyl esters of aromatic or cycloaliphatic polycarboxylic acids; and (C) optionally, at least one of reactive thinners, pigments, filler or other addtitives.

6 Claims, No Drawings

AQUEOUS DISPERSION OF EPOXY RESIN AND BLEND OF EPOXY RESIN-POLYOXYALKYLENE AMINES

BACKGROUND OF THE INVENTION

1. Field of the Invention

The present invention concerns epoxy-amine adducts for use as emulsifiers for epoxy resins; epoxy resin dispersions on an aqueous basis using said emulsifiers and a process for their production.

2. Description of the Related Art

It is known to produce synthetic resins by emulsion polymerization and to produce stable aqueous dispersions of these resins in that one stabilizes the resin in the aqueous phase by the addition of suitable dispersing agents or by incorporated hydrophilic groups. In the case of condensates such as epoxy resins, which are difficult to produce by emulsion condensation, one must resort however to other processes. One of the most frequently used processes is the dispersion of a condensation reaction produced polyglycidyl ether based upon multifunctional (i.e., polyhydric) alcohols, phenols, hydration products of these phenols and/or of novolac and the like, in the aqueous phase with use of one or more suitable dispersing agents or, as the case may be, emulsifiers. Such epoxy resin dispersions are generally quite unstable and tend after a short period of time to precipitation of the binder, in particular at temperatures above 25° C. The resulting epoxy resin dispersions exhibit as a rule particle sizes of more than 1 $\mu$m thus tend, after several weeks or, as the case may be, several months in storage, to coalesce, to increase in particle size, and therewith to a deterioration of the film forming properties.

Several of these epoxy resin dispersions can, for reduction of viscosity and increasing dispersion stability, also have reactive thinners added thereto during their production. These are however, because of their toxic properties and because of generally high vapor pressure, undesirable in view of their workplace hygienic properties. Besides this, the chemical properties of the hardened epoxy resin films are often negatively influenced by these reactive thinners. Conventionally available epoxy resin dispersions further contain solvents, benzyl alcohol and glycols or glycol ethers and the like, which are also undesirable.

Water soluble and aqueous based epoxy resin systems assumed increasing importance due to the above discussed disadvantages and due to environmental concern discussions and corresponding changes in the state of the law in Germany and Europe.

In BE-OS 4310198 it is for example described, that special non-ionic emulsifiers, which are polyol-epoxy addition products of (A) an aliphatic diol with an average molar mass of 200 to 20000 g/Mol and of (B) an epoxy compound with at least two epoxy groups per molecule and an epoxy equivalent weight of 100 to 2000 g/Mol and an equivalent ratio of the OH-groups to the epoxy groups of 3:3.5 to 1:10 and wherein the epoxy equivalent weight of the addition product lies between 150 g/Mol and at least 8000 g/Mol, are particularly suitable for use in aqueous soluble epoxy fluid resin systems. Said aliphatic polyol (A) are polyether polyols (poly alkylene glycols), the epoxy compounds (B) are polyglycidyl ethers on the basis of di-valent alcohols or of novolac resins, with bisphenol A being particularly preferred. The above described emulsifiers are produced by the condensation of polyether polyols (A) with the epoxy compound (B) in the presence of suitable catalysts.

By mixing the so obtained emulsifiers with epoxy-fluid resins on the basis of bisphenol A- and bisphenol F-glycidyl ethers on obtains a self emulsifying fluid resin system, which would polymerize with aqueous soluble amine resins, for example polyamines and polyoxyalkylene di- and polyamines with molecular weights of 100 to 2000 (JEFFAMINE®, Texaco Corporation.) to films with good properties, which find use above all as protective coatings for mineral primers or undersurfaces.

In DE-OS4309639 aqueous based epoxy resin dispersions are described, which contain:

(A-1) an epoxy resin, which is a condensation product which is comprised of:

(A-1-a) 50 to 90 wt. % of one or more epoxy compound(s) with at least two epoxy groups per molecule and an epoxy equivalent weight of 100 to 2000, (A-1-b) 5 to 50 wt. % of an aromatic polyol and, if desired, (A-1-c) 0 to 25 wt. % of modified compounds with at least two epoxy reactive groups, (A-2) a dispersing agent in the form of a condensation product of an aliphatic polyol with an average molecular weight (Mw) of from 200 to 20,000 and an epoxy compound with at least two epoxy groups per molecule and a epoxy equivalent weight of 100 to 2,000 wherein the equivalent ratio of the OH-groups to the epoxy groups is 1:0.8 to 1:3.5 and wherein the epoxy equivalent weight of this condensation product lies between 5,000 and 400,000 g/Mol, (B) a carboxyl group-containing or -releasing hardening agent for the epoxy resin (A-1), comprised of one or more carboxyl group-containing compound(s), wherein at least one of these compounds exhibits a functionality of at least three carboxyl groups and (C) if desired, conventional additives, wherein the components (A-1), (A-2) and (B) are employed in such weight amounts, that the equivalent ratio of the epoxy groups to the carboxyl groups participating in the reaction represents at least 1:0.5.

In the compounds according to (A-1-c) these are concerned with compounds for the targeted modification of the base resin (A-1) for example polyamine, poly(alkylene oxide) with terminal amino groups (for example JEFFAMINE®, of Texaco Corporation.), polycarboxylic acids and their anhydrides and the like. Their employment can occur, in order that by targeted modifications desired characteristics of the base resin (A-1) can be adjusted.

The described non-ionic stabilized dispersions of the aqueous epoxy resins (A-1) plus (A-2) produce, in a combination with the special polyvalent carboxylic acids (B), coating combinations, which can be hardened to particularly high value coatings.

In the European Patent document EP 0 109 173 there is described a hardenable two component epoxy resin compound on aqueous basis, of which the components are separately stored and mixed prior to use.

The first part, the component (A) or the base resin, is comprised of a glycidylether of Bispenol A or a derivative thereof. The diglycidyl ether is partially reacted with a polyoxy alkylene amine. The second part, the component (B) or the hardening agent, is comprised of a reactive polyamide polyamine.

The modified epoxy resin (A), which is converted or reacted with the polyoxyalkyl amine, acts as emulsifier, while at the same time retaining much of its epoxy functionality. This is an advantage with respect to the state of the art, which typically requires non-reactive emulsifiers for the formation of the aqueous based systems. The polyoxyalkyl amine is a block copolymer of ethylene oxide and propylene oxide with primary amino groups in the terminal positions, for example, a mono-amine (JEFFAMINE®, M-Series of Texaco Corp.) or a diamine (JEFFAMINE®, ED-Series of Texaco Corp.).

Part (B) of the two component composition or a mixture comprises a reactive, aqueous compatible polyamide polyamine, which is produced by reaction of multifunctional carboxylic acids, esters, anhydrides or mixtures thereof with a polyvalent amine, which can be aliphatic, cyclo- aliphatic or aromatic, or with mixtures thereof.

Upon hardening of base (A) with hardener (B) clear or colored highly glossy coatings are produced.

In U.S. Pat. No. 5,459,208 elastic hardened epoxy resin compounds are described, which comprise:

(A) reaction products of (A1) compounds with at least two 1,2-epoxide groups per molecule with parent (A2) polyoxyalkyleneonoamine with number average molecular weights of >900 g/mol, werein the polyoxyalklyenemonoamine contains a mol fraction of up to 20% of polyoxyethylene units, based on the total amount of polyoxypropylene and polyoxyethylene units, and, when desired, with (A3) polycarboxylic acids, and (B) hardeners and, when desired, (C) conventional additives.

As epoxy component (A1) there are preferably employed glycidyl ethers, which are derived from bisphenol and novolac resins, of which the epoxy equivalent weight is between 150 and 500 g/mol. There can also be employed polyglycidyl ethers on the bases of aliphatic alcohols. Preferred polyoxyalkylene monoamines (A2) are monoamine-block co-polymers, which contain oxypropylen and oxyethylene groups and which are obtainable from Texaco Chemical Co. under the trademark JEFFAMINE® M-series, for example JEFFAMINE® M-2005 with a molecular weight of approximately 2000 g/mol and an oxypropylen-oxyethylen ratio of 32/3.

Recently the importance of cold hardening, water soluble and aqueous, two-component based epoxy resin systems has strongly increased.

Therefore, it is the task of the present invention to provided emulsifiers for production of aqueous soluble and aqueous based epoxy resin components, with which epoxy resin dispersions can be obtained, which are non-ionicaly stabilized, solvent-free and, besides this, provide an exceptionally low viscosity system.

SUMMARY OF THE INVENTION

The task of the invention is solved by the provision of epoxy-amine adducts, which contain:

(A-1) one or more epoxy-amine adducts, obtained by conversion of at least one or more epoxy compound(s) on the basis of multifunctional aromatic or cycloaliphatic alcohols and/or of novolac resins with an epoxy functionality of >1 and ≦4 and an average epoxy equivalent weight of between 70 g/eq and 1000 g/eq with at least one or more amino-group-terminated polyalkyleneglycol(s) or with mixtures thereof with polyalkyleneglycols terminated with two amino groups, with an average amine-functionality of 0.5 to 1.5; an average molecular weight of 700 to 5000; ethyleneoxide content of ≧60 wt. %, based on the total amount of polyalkyleneglycol and a ratio of the reactive equivalents of the amine terminated polyalkyleneglycol or the amine-terminated polyalkyleneglycol-mixture to that of the polyepoxide or the polyepoxide-mixture of 0.01:1 to 0.9:1;

(A-2) one or more epoxy amine adducts, obtained by conversion of at least one or more epoxy compound(s) on the basis of multifunctional aliphatic alcohol with an epoxy functionality of >1 and ≦4 and an average epoxy equivalent weight of between 70 g/eq and 6000 g/eq with at least one or more amino-group-terminated polyalkyleneglycol(s) or with mixtures thereof with polyalkyleneglycol terminated with two amino groups, with an average amino functionality of 0.5 to 1.5; an average molecular weight of 700 to 5000; ethylenoxide content of ≧60 wt. %, based on the total content of polyalkyleneglycol and a ratio of the reactive equivalents of the amine terminated polyalkyleneglycol or the amine terminated polyalkyleneglycol mixture to that of the polyepoxide or the polyepoxide mixture of 0.01:1 to 0.9:1;

wherein the mixture ratio of the one or the more epoxy-amine adducts according to (A-1) to the one or more of the epoxy-amine adducts according to (A-2) lies between 5:95 and 95:5.

The inventive epoxy amine adducts are employed as emulsifiers for epoxy resins.

The subject matter of the invention relates also to hardenable, solvent free or poor epoxy resin aqueous dispersions, which contain:

(A-1) and (A-2) respectively one or more of the above described epoxy amine adducts;

(B-1) epoxy resins in the form of polyglycidyl esters on the basis of multifunctional aromatic or cycloalophatic alcohols and of novolac resins with an epoxy functionality of >1 and ≦3.5 and an average epoxy equivalent weight of between 70 g/eq and 1000 g/eq;

(B-2) if desired, epoxy resins in the form of polyglycidyl esters on the basis of aromatic or cycloalophatic polycarboxylic acids with an epoxy functionality of >1 and ≦3.5 and an average epoxy equivalent weight of between 70 g/eq and 1000 g/eq;

as well as, when desired, mixtures of (B-1) and (B-2);

(C) when desired, reactive thinners, pigments, fillers and further additives.

DETAILED DESCRIPTION OF THE INVENTION

The invention is now described in greater detail on the basis of illustrative examples.

The epoxy compounds, which are converted to the inventive emulsifier according to (A-1), exhibit epoxy functionalities of >1 and ≦4, preferably ≧1.5 and ≦2.7, as well as an average epoxy equivalent weight of between 70 g/eq and 1000 g/eq, preferably between 150 g/eq and 550 g/eq and particular preferably between 160 g/eq and 300 g/eq. Preferably there are employed in these epoxy compounds polyglycidyl ethers on the basis of multifunctional, preferably divalent aromatic or cycloalaphatic alcohols, such as phenols, hydration products of these phenols and/or of novolac resins (conversion products of one- or multifunctional phenols with aldehydes, in particular formaldehyde, in the presence of acidic catalysts).

As multifunctional phenols there can be mentioned for example: resorcinol, hydroquinone, 2,2-bis-(4-hydroxyphenyl)-propane (bisphenol A), isomeric mixtures of the dihydroxiydiphenylmethane (bisphenol F), tetrabromobisphenol A, 4,4'-dihydroxydiphenyl-cyclohexane, 4,4'-dihydroxy-3,3'-dimethyldiphenylpropane, 4,4'-dihydroxybiphenyl, 4,4'-Dihydroxybenzophenol, bis-(4-hydroxyphenyl)-1,1-ethane, 2,2-bis-[4-(2-hydroxypropoxy)phenyl]-propane, bis-(4-hydroxyphenyl)-1,1-isobutane, bis-(4-hydroxy-tert-butylphenyl)-2,2-propane, bis(4-hydroxyphenyl)-2,2-propane, bis-(2-hydroxynaphthyl)-methane, 1,5-dihydroxynaphthalene, tris-(4-hydroxyphenyl)-methane, bis-(4-hydroxyphenyl)-ether, bis- (4-hydroxyphenyl)-sulfone and the like, as well as halogenation products and hydration products of the above described compounds or mixtures thereof.

Particularly preferred are polyglycidyl ethers on the basis of bisphenol-A and bisphenol-F of novolac resins, and mixtures thereof.

Further, there can also be employed polyglycidyl esters of polycarboxylic acids, which can be obtained by the conversion with epicholrohydrin or similar epoxy compounds with an aromatic or cycloaliphatic polycarboxylic acid, for example with phthalic acid, terephthalic acids, hexahydrophthalic acid or also 2,6-naphthalenedicarboxylic acid. Examples include phthalic acid-diglycidyl ester, terephthalic acid-diglycidyl ester, hexahydrophthalic acid-diglycidyl ester, 2,6-naphthalenecarboxylic acid-diglycidyl ester. Further, there can be employed halogenation or hydration products or mixtures of the above described compounds, as well as mixtures with the above described epoxy compounds.

The above described epoxy compounds are reacted with one-, preferably however with two-, amine terminated polyalkylene glycols (polyoxyalkylene amines). As such there can be mentioned polyoxyalkylene diamines with molecular weights of approximately 700 to approximately 5000. The preferred amine terminated polyalkylene glycol or mixtures thereof have ethyleneoxide contents of $\geq 60$ wt. %, preferably $\geq 65$ wt. %, with respect to the total content of polyalkyleneglycol, and an average amino functionality of 0.5 to 1.5, preferably from 0.7 to 1.2 and molecular weight of preferably 1000 to 2000. They possess at least one, preferably however two, active amine hydrogen atoms, which are bound to the nitrogen atom.

The amine terminated polyalkyleneglycols with the above described advantageous characteristics are typically polyoxyalkylene monoamines, that is, compounds which for example are obtainable under the trademark JEFFAMINE® of Texaco Corp. (now Huntsman Corp.). JEFFAMINE® M-1000 is preferably an (ethyleneoxide/propyleneoxide)-copolymer with a molar ratio x of approximately 18.6 (ethyleneoxide component) to y of approximately 1.6 (propyleneoxide component) according to the following structural formula and a molecular weight of approximately 1000, which is terminated with an amino group. JEFFAMINE® M-2070 is a corresponding copolymer with a molar ratio x of approximately 32 (ethyleneoxide component) to y of approximately 10 (propyleneoxide component) and a molecular weight of approximately 2000, which is terminated with an amino group. Preferably mixtures of JEFFAMINE® M-1000 and JEFFAMINE® M-2070 are employed. There can also be employed JEFFAMINE® M-715 with a molecular weight of approximately 700 or the experimental amine number 6940-29 with a molecular weight of approximately 3000, which is terminated with an amino group. As polyoxyalkylenediamine there can be employed (ethyleneoxide/propyleneoxide)-copolymers with molecular weights of approximately 90 to 5000, preferably of 1000 to 2000, which are terminated with two primary amino groups. Diamines of this type are available from Texaco Corp. under the trademark JEFFAMINE® ED-series.

The reaction or conversion products to epoxy functional dispersing agents/emulsifier resins exhibit for example the following idealized structure which is based on the structures of the starting components:

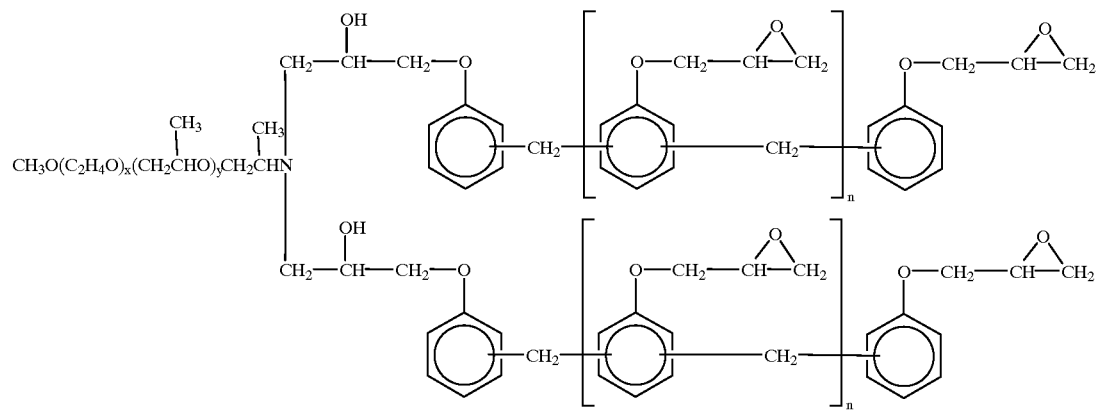

Polyoxyalkylene amine component
JEFFAMINE ® M-1000
JEFFAMINE ® M-2070
X and y see above Epoxy resin component
Novolac resin or
Polyglycidylether
On the basis of aromatic phenols
n = 0 to 2,
preferably = 0 to 0.7

The ratio of the reactive equivalents of the polyoxyalkyleneamine or the polyoxyalkyleneamine-mixture to that of the polyepoxy or the polyepoxy-mixture is in the range of approximately 0.01:1 to 0.9:1, preferably in the range of 0.0:1 to 0.7:1. The conversion of polyoxyalkyleneamine and polyepoxy occurs in a temperature range of approximately 70° C. to 180° C., preferably from 90° C. to 150° C., in a nitrogen atmosphere and if desired in the presence of epoxy-amine accelerators, for example in the presence of salicylic acid, tri(dimethylaminomethyl)phenol or other suitable tertiary amines and the like. The conversion or reaction is carried out so long, until the reactive amine hydrogen-equivalents contained in the amine terminated polyalkyleneglycol are at least 50% converted. The preferred conversion amount of amine and epoxy is at $\geq 70\%$, preferably at ≧85%, on the basis of the reactive amine hydrogen equivalent in amine terminated polyalkyleneglycol.

The epoxy compounds, which are converted to the inventive dispersing agent/emulsifier according to (A-2), exhibit an epoxy functionality of >1 and ≦4, preferably ≧1.5 and ≦2.7, as well as average epoxy equivalent weights of between 70 g/eq and 6000 g/eq, preferably between 150 g/eq 3500 g/eq and particularly preferably between 250 g/eq and 800 g/eq. Preferred among these epoxy compounds are polyglycidyl ethers on the basis of multifunctional aliphatic, preferably di-valent aliphatic alcohols and particularly preferred are di-valent polyalkyleneglycols. Particularly preferred are polypropyleneglycol-diglycidyl ether and diglycidyl ether on the basis of (ethyleneoxide/propyleneoxide)-copolymers or mixtures of these diglycidyl ethers.

There can also be employed polyglycidyl esters of polycarboxylic acids, which can be obtained by conversion of epichlorohydrin or similar epoxy compounds with an aliphatic polycarboxylic acid, for example with adipic acid, suberic acid, sebacic acid and the like, or also with polyglycol diacids, for example with an average molecular weight of approximately 600 (as described in Chemical Abstracts under CAS-Nr. 39 927-08-07), which are obtainable from Hoechst AG. Also suitable are halogenation products of the above described compounds, as well as mixtures with the above described epoxy compound.

The above mentioned epoxy compounds are reacted with one-, or preferably a mixture of amine terminated polyalkyleneglycols (polyoxyalkylene amines). As such there can be employed polyoxyalkylene monoamines or their mixtures or mixtures of the same with polyoxyalkylene diamines with molecular weights of approximately 700 to 5000. The preferred amine terminated polyalkyleneglycols exhibit an ethyleneoxide content of ≧60 wt. %, preferably of ≧65 wt. %, based on the total content of polyalkyleneglycol, wherein these mixtures exhibit an average amino functionality of 0.5 to 1.5, preferably from 0.7 to 1.2 and molecular weights of preferably 1000 to 2000. They comprise at least one, preferably however two, active amine hydrogen atoms, which are bound to a nitrogen atom. Preferred polyoxyalkylene amines are the polyoxyalkylene monoamines described above in greater detail under (A-1), which for example are available under the trademark JEFFAMINE® M-1000 and JEFFAMINE® M-2070 from Texaco Corp. Preferably mixtures of JEFFAMINE® M-1000 and M-2070 are employed. There can also be employed JEFFAMINE® M-715 with a molecular weight of approximately 700 or the experimental amine Nr. 6940-29 with a molecular weight of approximately 3000, which is terminated with an amino group. As polyoxyalkylene diamines there can be employed (ethyleneoxide/propyleneoxide)-copolymers with molecular weights of approximately 900 to 5000, preferably from 1000 to 2000, which are terminated with two primary amino groups. Diamines of this type are available from Texaco Corp. under the trademark JEFFAMINE® ED-Series.

The conversion products of the epoxy functional dispersion agent/emulsifier resin exhibit for example the following idealized structure which is based on the structures of the starting components:

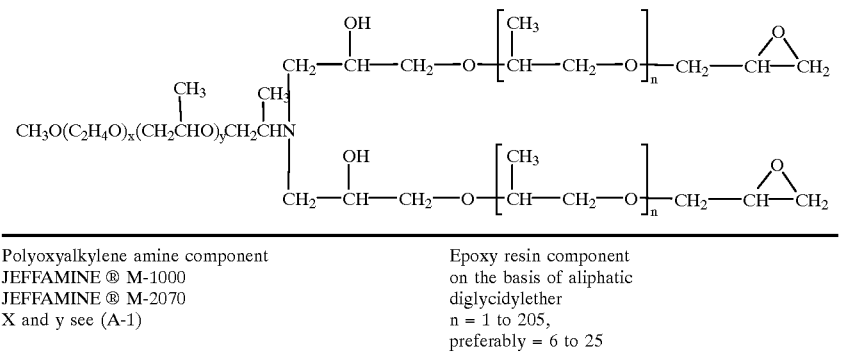

| Polyoxyalkylene amine component | Epoxy resin component |
|---|---|
| JEFFAMINE ® M-1000 | on the basis of aliphatic |
| JEFFAMINE ® M-2070 | diglycidylether |
| X and y see (A-1) | n = 1 to 205, |
| | preferably = 6 to 25 |

The ratio of the reactive equivalent of the polyoxyalkylene amine or the polyoxyalkylene amine-mixture to that of the polyepoxy or the polyepoxy-mixture is in the range of approximately 0.01:1 to 0.9:1, preferably in the range of 0.1:1 to 0.7:1. The conversion of polyoxyalkylene amine and polyepoxy occurs in a temperature range of approximately 70° C. to 180° C., preferably from 90° C. to 150° C., in a nitrogen atmosphere and in certain cases in the presence of an epoxy-amine-accelerator, for example in the presence of salicylic acid, tri(dimethylaminomethyl)phenol or other suitable tertiary amines and the like. The conversion is carried out so long, until the reactive amine hydrogen-equivalents contained in the amine terminated polyalkyleneglycol are at least 50% converted. The preferred conversion degree of amine and epoxy is at ≧70%, preferably at ≧85%, based on the reactive amine hydrogen equivalents in amine terminated polyalkyleneglycol.

The inventive emulsifier mixture contains at least one epoxy resin-amine adduct of each of the substances described under (A-1) and (A-2). The mixture ratio of one epoxy-amine adduct or one epoxy-amine-adduct-mixture according to (A-1) to one epoxy-amine adduct or one epoxy-amine-adduct-mixture according to (A-2) is between 5:95 and 95:5, preferably between 10:90 and 90:10, particularly preferably however between 20:80 and 80:20. In the illustrative examples mixture ratios of 33:67, 67:33 and 50:50 are provided, wherein the last is particularly preferred.

It has been shown, that the inventive dispersion agent/ emulsifier on the basis of amine terminated polyalkyleneglycol with the indicated amine functionalities leads to extraordinarily low viscosity systems. A further advantage is to be seen therein, that the systems after reaction and incorporation of the dispersing agent/emulsifier in the polymer skeleton and through hardening with suitable amine-hardeners produce coatings and surfacings with good water- and chemical characteristics and as coatings on metallic substrates provide excellent corrosion protection and good mechanical properties such as high impact resistance and low brittleness.

The dispersing agent/emulsifier components described under (A-1) and (A-2) are mixed and homogenized with the epoxy resin or mixtures thereof described below under (B-1) and (B-2).

The epoxy resin according to (B-1) and (B-2) or mixtures of the same exhibit an epoxy functionality of >1 and $\leq 3.5$, preferably from $\geq 1.5$ and $\leq 2.7$ as well as an average epoxy equivalent weight of between 70 g/eq and 1000 g/eq, preferably between 100 g/eq and 550 g/eq and particularly preferably between 150 g/eq and 300 g/eq. Preferably, in the case of the epoxy compound according to (B-1), this is a polyglycidyl ether on the basis of multifunctional, preferably divalent aromatic or cycloaliphatic alcohols, such as phenols, hydration product of these phenols and/or of novolac resins (reaction products of one or multifunctional phenols with aldehydes, in particular formaldehyde in the presence of acidic catalysts).

As multifunctional phenols there can be mentioned for example: resorcinol, hydroquinone, 2,2-bis-(4-hydroxyphenyl)-propane (bisphenol A), isomeric mixtures of the dihydroxiydiphenylmethane (bisphenol F), tetrabromobisphenol A, 4,4'-dihydroxydiphenyl-cyclohexane, 4,4'-dihydroxy-3,3'-dimethyldiphenylpropane, 4,4'-dihydroxybiphenyl, 4,4'-Dihydroxybenzophenol, bis-(4-hydroxyphenyl)-1,1-ethane, 2,2-bis-[4-(2-hydroxypropoxy)phenyl]-propane, bis-(4-hydroxyphenyl)-1,1-isobutane, bis-(4-hydroxy-tert-butylphenyl)-2,2-propane, bis(4-hydroxyphenyl)-2,2-propane, bis-(2-hydroxynaphthyl)-methane, 1,5-dihydroxynaphthalene, tris-(4-hydroxyphenyl)-methane, bis-(4-hydroxyphenyl)-ether, bis-(4-hydroxyphenyl)-sulfone and the like, as well as halogenation products and hydration products of the above described compounds or mixtures thereof.

There can also according to (B-2) be employed polyglycidyl esters of polycarboxylic acids, which can then via conversion of epichlorohydrin or similar epoxy compounds with an aromatic or cycloaliphatic polycarboxylic acid, for example with phthalic acid, phthalic acid, terephthalic acids, hexahydrophthalic acid or also 2,6-naphthalenedicarboxylic acid. Examples include phthalic acid-diglycidyl ester, terephthalic acid-diglycidyl ester, hexahydrophthalic acid-diglycidyl ester, 2,6-naphthalenecarboxylic acid-diglycidyl ester. Further, there can be employed halogenation or hydration products or mixtures of the above described compounds, as well as mixtures with the above described epoxy compounds.

The average molecular weight of the polyoxyalkylene amines, which are contained in the above described aqueous soluble or water based mixture of dispersing agent/emulsifier components (A-1) and (A-2) and epoxy resin (B-1) and (B-2), are at least 800, based on the polyoxyalkylene amine content in the total mixture, and are preferably between 900 and 2500 and most preferably between 1200 and 1800, with respect to the polyoxyalkylene amine content in the total mixture. The mixtures of dispersing agent/emulsifier component (A-1) and (A-2) and epoxy resin component (B-1) and when desired (B-2) and, when desired, reactive thinners, further contain at least 2.9 wt. %, preferably 3.5 to 9.3 wt. %, and in the most preferred preferably 3.7 to 6 wt. %, of chemically bonded ethyleneoxide, based upon the total mixture of the epoxy functional components, which exclusively are provided by the dispersing agent/emulsifier component.

The mixing and homogenization of the individual components can be achieved by utilization of fluid emulsifier component (A-1) and (A-2) and fluid epoxy compound (B-1) and (B-2) in stirring devices or also by stirring by hand within a few minutes at room temperature (approximately 20 to 25° C.). In the case of using a partially crystallized, weakly reactive or solidified dispersing agent component and/or epoxy compound then a preliminary careful warming up of the dispersing agent component and/or epoxy compound, preferably under nitrogen atmosphere, to cause melting, is necessary.

For production of stabilized low viscosity epoxy resin dispersions the above mentioned substance mixtures are dispersed in water by means of a suitable dispersing process in a suitable dispersing apparatus. The production of the epoxy resin dispersion can occur under discontinuous or preferably continuous addition of water to the substance mixture under forceful stirring and with high shear force at temperatures of $\leq 100°$ C., preferable of $\leq 60°$ C. and even more preferably of $\leq 45°$ C. There can, when it is desired, be supplementally added suitable antifoaming agents and de-aerators or de-gassers, for example polysiloxane, mineral oil antifoaming agents and the like. As example there can be mention BYK®-024 (mixture of antifoaming agent polymer and polysiloxane) of BYK-Chemie GmbH. Suitable dispersion apparatuses are colloidal mills, homogenizers, and dissolvers with a toothed disc or other rapid mixers with high shear forces.

For viscosity reduction and improvement of the rheological properties of the dispersing agent and epoxy resin mixture and the aqueous dispersion, further modifiers or assistant agents can be added. Among the supplemental agents there can be mentioned, for example, for epoxy resin systems, conventional mono- to poly-valent reactive thinners, such as for example alkyl-$C_{12}/C_{14}$-glycidylether, cresylglycidylether, hexanedioldiglycidylether, polyglycidyl ester and the like, but also including extenders, fluidifiers and softeners, as well as solvents and mixtures thereof.

With the dispersing agent/emulsifier component according to (A-1) and (A-2) there are obtained, by mixing with epoxy resin (B-1) and/or (B-2) and subsequent dispersion in water, as described above, stable pigmentable or colorable aqueous dispersions with solid content of $\geq 99$ wt. %, preferably $\geq 80$ wt. % and, depending upon the respectively selected dispersion process and the solid particle adjustment or selection, with particle sizes of $\leq 1$ $\mu$m after dispersion.

The mixing of the inventive epoxy resin dispersion with suitable hardening agents or hardening agent mixtures occurs usually prior to use, with the respective suitable mixture ratio. As hardening agent for the hardening at room temperature and/or lower temperatures there are suitably employed water soluble, water dispersible or water based amine hardening agents for epoxy compounds with an amine hydrogen functionality >2, which are within the state of the art, for example on the basis of modified Mannich bases, amino amides, amino imidazoles or modified amine epoxy adducts or mixtures of the same and others, as describes in the patents WO 93/12187, DE 4304562, WO 93/21250, EP 0567831, EP-A-0000605, EP 0387418 DE 2332177 and DE 2361671.

Also suitable are araliphatic amines, polyalkylene amines and polyoxyalkylenediamines. Appropriate hardening agents are available in trade for example under the trademarks BECKOPOX (Hoechst AG), EPILINK (Akzo Chemicals GmbH), EUREDUR (Witco GmbH), CASIMID, VERSAMID (Henkel KgaA), RTC 14421/17 (Product Reference of Dow Chemicals Co.) and JEFFAMINE D and T (Texaco Corp./Huntsman Corp.). Also suitable are aqueous soluble, water dispersible or water based, modified mercaptans or mercaptan-epoxy adducts with a mercaptan hydrogen functionality greater than two as hardening agent.

The hardening agents or hardening agent mixtures are generally employed in an epoxy to amine or, as the case may be, mercaptan hydrogen equivalent ratio of 1:0.5 to 1:2.0. A forced hardening of the coating or over-coating can occur for example by heating to approximately 50° C. to 120° C. over a period of time of approximately 10 to 130 minutes.

As further conventional additives, of which can be present in the inventive dispersion, are for example the conventional paint additives such as pigments, pigment pastes, anti-oxidants, anti-running or, as the case may be, thickening agents, de-foaming/de-aerating or de-gassing and/or wetting agents, reactive thinners, fillers, catalysts, conservatives, protective colloids and the like. The pigmentation and filling can occur selectively either in the inventive epoxy resin dispersion or in the hardening agent, or respectively separated in both components and/or separate in a third and/or fourth component. For epoxy resin heat treated cement systems there are in a conventional manner three or more component mixture systems provided, however two component formulations are also possible. The production of the lacquer or varnish, coating and over-coating components occurs in conventional lacquer or varnish and over-coating processes with utilization of suitable mixing apparatus', for example with dissolvers, stirrers, bead mills and homogenizers.

The inventive epoxy resin dispersion and the water soluble, water dispersible or aqueous based substance mixture with the above described epoxy components are in particular suitable as dispersion binders for a) anti-corrosion coatings, lacquers or paints and over-coatings for metals (for example on abrasion blasted, phosphatized, zinked or otherwise pretreated steel; aluminum, abrasive blasted, chromatized, anodized, or in otherwise pre-treated aluminum; copper, pre-treated copper; brass, pre-treated brass; alloys and the like) and on corroded metal (for example on corroded steel; corroded zinc and aluminum), b) coating and surface layers for flooring and industrial floorings, c) epoxy resin heat treated mineral systems (for example epoxy resin heat treated cement systems (ECC-Systems)), d) protective and the appearance improving coatings, over-coating and lacquers or paints for plaster, concrete (also green concrete), masonry material and cement, and also for wood and diverse plastic, e) coatings for refinishing and sanitation of old coatings and old over-coatings, f) the production of water dispersible and water soluble pigment and filling preparations, g) combinations, mixtures and polymerizates with other dispersion binding agents or dispersions for adjustment of particular characteristics, in particular for the defined adjustment of the water solubility, the dispersability with fillers and pigments, the film forming characteristics and the drying behavior, h) the production of adhesives, sealants and joint compounds.

The invention will be described in greater detail on the basis of the following, without however that the invention should be considered in any way limited to these examples.

EXAMPLE

The following abbreviations are employed:
BPADGE Diglycidylether of bisphenol A
BPFDGE Diglycidylether of bisphenol F
PPGDGE Polypropyleneglycol-diglycidylether
PPGTGE Polypropyleneglycol-triglycidylether
PNPGE Polyglycidylether of Phenol-Novolac
JAM1 JEFFAMINE® M-1000 (Texaco Corp.)
JAM2 JEFFAMINE® M-2070 (Texaco Corp.) (Polyoxyalkylenemonoamine)
EEW Epoxy equivalent weight g/eq.
AEW Aminehydrogen-Equivalent weight g/eq.

I Emulsifier Components

All the following described production steps are carried out in the presence of a nitrogen atmosphere.

I-1 Polypropyleneglycol-diglycidylether (PPGDGE) and Polyoxyalkylenemonoamine JEFFAMINE® M-1000 and M-2070 (JAM1/JAM2)

Into a heatable 1 liter reaction container with a lid, which is provided with a heatable drip funnel and a stirrer, are introduced 205.76 g PPGDGE with an epoxy equivalent weight (EEW) of 313 to 345, which is available under the trademark POLYPOX® 19 from Pruemer-Polymer Chemie GmbH and preheated to 125° C. Into the drip funnel there is introduced a homogenized mixture of 120 g JAM1 and 120 g JAM2, produced by melting of JAM1 at 60° C. and preheating of JAM2 to 60C. and subsequent mixing and homogenizing by means of a anchor agitator, and preheated to 90° C. The preheated JAM1/JAM2-mixture is then dropwise added continuously over a period of time of approximately 4 hours under good stirring, whereby the temperature of the reaction mixture is maintained at a temperature of between 122 and 130° C. Subsequently the temperature is held at 125° C. for 2 further hours. After cooling off of the reaction batch or feed material to room temperature (23° C.) a fluid reaction product is obtained which at room temperature storage becomes cloudy (tends to crystallize). Until further use it is stored in a nitrogen atmosphere.

The titration to obtaining the EEW is carried out as described in PCT-Application WO 95/01387 at page 21. The titrated EEW of the reaction product has a value of 1483 g/eq.

I.2 Polypropyleneglycol-diglycidylether (PPGDGE) and Polyoxyalkylenemonoamine JEFFAMINE® M-1000 and M-2070 (JAM1/JAM2)

The production of the emulsifier components occurs as carried out in Example I.1, however, under use of a PPGDGE with an epoxy equivalent weight (EEW) of 300 to 330, which is obtainable under the trademark GRILONIT® F 704 from EMS-Chemie. For conversion with the JAM1/JAM2-mixture obtained in Example I.1 196.75 g PPGDGE are provided in a reaction container. After the reaction, one obtains a titrated EEW of 1386. A fluid reaction product is obtained, which becomes cloudy at room temperature storage. Until further use it is stored in a nitrogen atmosphere.

I.3 Polypropyleneglycol-diglycidylether (PPGDGE) and Polyoxyalkylenemonoamine JEFFAMINE® M-1000 and M-2070 (JAM1/JAM2)

The production of the emulsifier component occurs as carried out in Example I.1, however, under use of a PPGDGE with an epoxy equivalent weight (EEW) of 455 to 550, which is available under the trademark EUREPOX® RV-F from Witco GmbH. For conversion with the JAM1/JAM2-mixture introduced in Example I.1 315.43 g PPGDGE are provided in a reaction container. After the conversion one obtains a titrated EEW of 1811. A fluid reaction product is obtained, which becomes cloudy when stored at room temperature. Until further use it is stored in a nitrogen atmosphere.

I.4 Polypropyleneglycol-triglycidylether (PPGTGE) and Polyoxyalkylenemonoamine JEFFAMINE® M-1000 and M-2070 (JAM1/JAM2)

The production of the emulsifier component occurs as carried out in Example I.1, however, under utilization of a PPGTGE with an epoxy equivalent weight (EEW) of 625 to 769, which is available under the trademark EUREPOX® RV-L from Witco GmbH and with the following described process changes. For the conversion with the JAM1/JAM2-mixture introduced in Example I.1 435.35 g PPGTGE are introduced into a reaction container and preheated to 125° C. The preheated JAM1/JAM2-mixture is then added dropwise continuously over a period of time of approximately 3.5 hours with good stirring, whereby the temperature of the reaction mixture is maintained between 122 and 135° C. Subsequently the temperature is maintained at 125° C. for a further hour. After cooling off of the reaction batch to room temperature (23° C.) a fluid reaction product is obtained. After the reaction one obtains a titrated EEW of 1874. Until further use the reaction product is stored in a nitrogen atmosphere.

I.5 Polyglycidylether of Phenol-Novolac (PNPGE) and Polyoxyalkylenemonoamine JEFFAMINE® M-1000 and M-2070 (JAM1/JAM2)

In a heatable 1 liter reaction container with a lid, which is provided with a heatable drip funnel and a stirrer, are provided and preheated to 125° C. 130 g PNPGE with an epoxy equivalent weight (EEW) of 172 to 183, which is available under the product reference XZ95345.02 from Dow Chemical. In the drip funnel there is provided a homogenized mixture of 140.30 g JAM1 and 140.30 g JAM2, produced by melting of JAM1 at 60° C. and pre-warming JAM2 to 60° C. and subsequent mixing and homogenization by means of a anchor stirrer, and preheated to 70° C. The preheated JAM1/JAM2 is then added dropwise continuously over a period of approximately three hours with good stirring, whereby the temperature of the reaction mixture is maintained at between 122 and 133° C. Subsequently the temperature is maintained at 125° C. for a further hour. After cooling off of the reaction batch to room temperature (23° C.) a fluid reaction product is obtained, which clouds at room temperature (slight crystallization tendency). Until further utilization it is stored in a nitrogen atmosphere. The EEW produced by titration corresponds to 1183 g/eq.

I.6 Diglycidylether of Bisphenol A (BPADGE) and Polyoxyalkylenemonoamine JEFFAMINE® M-1000 and M-2070 (JAM1/JAM2)

The production of the emulsifier component occurs as in Example I.5, however under utilization of a BPADGE with an epoxy equivalent weight (EEW) of 182 to 192, which is available under the trademark EUREPOX® 710 from Witco GmbH. For conversion with the JAM1/JAM2-mixture introduced in Example I.5 136.61 g of BPADGE are provided in a reaction container. After the conversion one obtains a titrated EEW of 1100 g/eq. A fluid reaction product is obtained, which becomes turbid when stored at room temperature. Until use it is stored in a nitrogen atmosphere.

I.7 Mixtures of Emulsifier Components

I.7.1 Emulsifier Mixture 1

The production of the mixture of emulsifier components occurs by mixing and homogenizing the emulsifier components of Example I.1 and Example I.5 in a mixture ratio of 1:2. For this the produced turbid emulsifier components were pre-warmed to 60° C. and maintained at this temperature until in each case an optically clear component became available. Thereafter there occurred the mixing and homogenizing and the further processing as described below in the examples under item II.

I.7.2 Emulsifier Mixture 2

The production of the mixture of emulsifier components occurs by mixing and homogenizing the emulsifier components of Example I.3 and Example I.5 in a mixture ratio of 2:1. For this the turbid produced emulsifier components were pre-warmed to 60° C. and maintained at this temperature until in each case an optically clear component became available. Thereafter there occurred the mixing and homogenizing and the further processing as described below in the examples under item II.

I.7.3 Emulsifier Mixture 3

The production of the mixture of emulsifier components occurs by mixing and homogenizing the emulsifier components of Example I.4 and Example I.5 in a mixture ratio of 1:1. For this the produced turbid emulsifier components were pre-warmed to 60° C. and maintained at this temperature until in each case an optically clear component became available. Thereafter there occurred the mixing and homogenizing and the further processing as described below in the examples under item II.

I.7.4 Emulsifier Mixture 4

The production of the mixture of emulsifier components occurs by mixing and homogenizing the emulsifier components of Example I.2 and Example I.6 in a mixture ratio of 1:1. For this the produced turbid emulsifier components were pre-warmed to 60° C. and maintained at this temperature until in each case an optically clear component became available. Thereafter there occurred the mixing and homogenizing and the further processing as described below in the examples under item II.

II. Water Dispersible Mixtures of Emulsified Components with Epoxy Resins

II.1 Emulsifier Mixture and Diglycidylether on Basis of Bisphenol A (BPADGE) and Bisphenol F (BPFDGE)

Into a 1 liter plastic container are introduced 92.10 g of a mixture of EPADGE and BPFDGE with a epoxy equivalent weight (EEW) of 172 to 182, which is available under the trademark ARALDIT® PY304 from Ciba-Geigy. Subsequently 10.5 g of the crystallization free Emulsifier Mixture 1 are added. The mixtures are homogenized using a anchor stirrer with low rpm. They exhibit an EEW of approximately 190 to 200 g/eq and can be employed as a water dispersible compound mixture.

II.2 Emulsifier Mixture 2 and Polyglycidyl Ether on the Basis of Phenol-Novolac (PNPGE)

Into a 3 liter plastic container is introduced 1382.54 g of a PNPGE with an epoxy equivalent weight (EEW) of 169 to 179, which is available under the trademark ARALDIT® BY307-1 from Ciba-Geigy. Subsequently 165 g of the crystallization free Emulsifier Mixture 2 are added. The mixture is then homogenized with a anchor stirrer under low rpm. It exhibits an EEW of approximately 187 to 197 g/eq and can be used as a water dispersible compound mixture.

II.3 Emulsifier Mixture 2 and polyglycidyl ether on the basis of Phenol-Novolac (PNPGE) and reactive thinner In a 0.5 liter plastic container are added 86.17 g of a PFPGE with an epoxy equivalent weight (EEW) of 169 to 179 which is available under the trademark ARALDITO PY 307-1 from Ciba-Geigy and 5 g of an alkyl-$C_{12}/C_{14}$-glycidylether with an EEW of 298 to 328, which is available as a reactive thinner under the trademark EUREPOX® RV-E from Witco GmbH. Subsequently 12 g of the crystallization free Emulsifier Mixture 2 are added. The mixture is homogenized with an anchor stirrer under low rpm. It exhibits an EEW 192 to 207 g/eq and can be employed as a water dispersible compound mixture.

II.4 Emulsifier Mixture 4 and Glycidylether on the Basis of Bisphenol A (BPADGE) and Bisphenol F (BPFDGE)

Into a 1 liter plastic container are introduced 433.2 g of a mixture of BPADGE and BPFDGE with an epoxy equivalent weight (EEW) of from 175 to 185, which is available under the trademark EUREPOX® 720 LV from Witco GmbH. Subsequently 48 g of the crystallization free Emulsifier Mixture 4 are added. The mixture is homogenized with an anchor stirrer with low rpm. It exhibits EEW of approximately 192 to 202 g/eq and can be employed as a water dispersible compound mixture.

III. Aqueous Epoxy Resin Dispersions

III.1 Dispersion of the Mixture II.2 (Emulsifier Mixture 2 and Polyglycidyl Ether on the Basis of Phenol-Novolac (PNPGE)) in Water For dispersion of the mixture in water there is employed a dispersion apparatus of the type MOLTENI Model TM.5 R.S.V. of Officine Meccaniche Molteni S.r.l., I-20030 Senago, Italy with a stainless steel double wall container with an internal diameter of approximately 20 cm, edge strippers, a tooth disk with a disk diameter of 10 cm as stirrer and attached water coolant set to 5° C.

1477.2 g of the mixture II.2 are pre-cooled in the above described dispersion apparatus, with stirring at low rpm. Via a drop funnel there is subsequently continuously added de-mineralized water pre-cooled to 8 to 10° C. at approximately 4800 rpm in the closed container and dispersed. The amount added is approximately 75 to 85 ml/10 min. In the realm of about 82% solid bodies the viscosity strongly increases, and during subsequent occurring solid body settling a phase conversion occurs and the formation of an epoxy resin emulsion of the O/W (oil in water)-type occurs. Upon achieving about 70% solids the viscosity strongly decreases and with strong spraying or splashing the rotation count is subsequently step wise reduced to approximately 2000 rpm. After achieving 65% solids one permits the produced epoxy resin dispersion I (EPUD I) to defoam overnight.

In order to obtain a fine as possible epoxy resin dispersion, the temperature should not exceed 45 to 50° C. The maximum temperature during production of the above identified dispersion is approximately 41° C. The average particle size which was determined using a Micro Trac UPA particle size measuring device with attached calculation unit of Leeds & Northrup GmbH, Krefeld, corresponds to 0.8 $\mu$m.

III.2 Dispersion of Epoxy Resin Containing Mixture in Water

First a mixture of emulsifier components is produced by mixing and emulsifying the emulsifier component I.2 with the emulsifier component I.5 in a mixture ratio 1:1. Turbid appearing partially crystallized emulsifier components are preliminarily heated to 60° C. and maintained at this temperature for such a period of time, until respectively an optically clear component is at hand. Thereafter, there occurs the mixture of the emulsifier components with the epoxy resin and the homogenization.

In the above-described dispersion apparatus, 1484 g of polyglycidyl ether of phenol-novolac (PNPGE) with an epoxy equivalent weight (EEW) of from 172 to 183 which is available under the product name XZ 95345.02 from Dow Chemical. Subsequently 160 g of the previously mentioned crystallization free emulsifier mixture are added. The emulsifier mixture and the PNPGE are mixed at low rpm and homogenized. The mixture has an EEW of approximately 189 to 199 g/eq and can be employed as a water dispersible composition.

These mixtures of emulsifier components and PNPGE are pre-cooled to 5° C. with stirring at low rpm in a dispersion apparatus. Via a drop funnel are subsequently continuously added de-mineralized water pre-cooled 8 to 10° C. at approximately 4800 rpm into the closed container and dispersed. The added amount corresponds to approximately 150 to 160 ml/10 min. In the range of approximately 82% solids the viscosity strongly increases, and at subsequent occurring solid body lowering a phase conversion occurs and the formation of an epoxy resin emulsion of the O/W (oil in water)-type occurs. Upon achievement of 70% solids the viscosity eventually sinks, and upon strong splashing or spraying the rpm is subsequently step-wise reduced to approximately 2000 rpm. After achieving a final 50% solids one allows the produced epoxy resin dispersion II (EPD II) to defoam overnight.

In order to obtain a fine as possible epoxy resin dispersion the temperature should not exceed 45 to 50° C. The maximal temperature during the production of the above-described dispersion corresponds to approximately 42° C. The average particle size, which is determined using a Micro Trac UPA particle size measuring device with attached calculator from Leeds & Northrup GmbH, Krefeld, corresponds to 0.6 $\mu$m.

III.3 Dispersion of Epoxy Resin Containing Mixture in Water

First a mixture of emulsifier components is produced by mixing and emulsifying the emulsifier component I.2 with the emulsifier component I.5 in a mixture ratio 1:2. Turbid appearing partially crystallized emulsifier components are preliminarily heated to 60° C. and maintained at this temperature for such a period of time, until respectively an optically clear component is at hand. Thereafter, there occurs the mixture of the emulsifier components with the epoxy resin and the homogenization.

In the above-described dispersion apparatus, 1522.87 g of polyglycidyl ether of phenol-novolac (PNPGE) with an epoxy equivalent weight (EEW) of from 172.5 to 183 which is available under the product name XZ 95345.02 from Dow Chemical. Subsequently 160 g of the previously mentioned crystallization free emulsifier mixture are added. The emulsifier mixture and the PNPGE are mixed at low rpm and homogenized. The mixture has an EEW of approximately 191 to 201 g/eq and can be employed as a water dispersible composition.

These mixtures are pre-cooled to 5° C. with stirring at low rpm in a dispersion apparatus. Via a drop funnel are subsequently continuously added de-mineralized water pre-cooled to 8 to 10° C. at approximately 4800 Rpm into the closed container and dispersed. The added amount corresponds to approximately 150 to 160 ml/lo min. In the range of approximately 82% solids the viscosity strongly increases, and at subsequent occurring solid body lowering a phase conversion occurs and the formation of an epoxy resin emulsion of the O/W (oil in water)-type occurs. Upon achievement of a solid body of 70% the viscosity eventually sinks, and upon strong splashing the rpm is subsequently step-wise reduced to approximately 2000 rpm. After achieving a final 50% solids one allows the produced epoxy resin dispersion III (EPD III) to defoam overnight.

In order to obtain a fine as possible epoxy resin dispersion the temperature should not exceed 45 to 50° C. The maximal temperature during the production of the above-described dispersion corresponds to approximately 42° C. The average particle size, which is determined using a Micro Trac UPA particle size measuring device with attached calculator from Leeds & Northrup GmbH, Krefeld, corresponds to 0.8 μm.

III.4 Dispersion of the Mixture II.4 (Emulsifier Mixture 4 and Diglycidyl Ether on the Basis of Bisphenol A (BPADGE) and Bisphenol F (BPFDGE) in Water 1283.2 g of the mixture II.4 are pre-cooled with stirring at slow rotation in the dispersion apparatus described under III.1. Subsequently demineralized water pre-cooled to 8 to 10° C. is continuously added and dispersed at approximately 4800 rpm in the closed container. The amount added corresponds to approximately 135 to 145 ml/10 min. In the range of approximately 82% solids the viscosity strongly increases, and upon subsequent occurring solid body precipitation a phase conversion and a formation of an epoxy resin emulsion of the O/W (oil-in-water)-type occurs. Upon achieving about 70% solids the viscosity eventually is reduced, and upon strong splashing the rpm is subsequently step-wise reduced to approximately 2000 rpm. After achieving 65% solids one allows the produced epoxy resin dispersion IV (EPD IV) to defoam overnight.

In order to obtain a fine as possible epoxy resin dispersion the temperature should not exceed 45 to 50° C. The maximal temperature during the production of the above-described dispersion corresponds to approximately 42° C. The average particle size, which is determined using a Micro Trac UPA particle size measuring device with attached calculator from Leeds & Northrup GmbH, Krefeld, corresponds to 0.7 μm.

IV. Filling and Pigmentation of the Emulsifier and Epoxy Resin Mixture Prepared According to II or, as the case may be, the Epoxy Resin Dispersion Produced According to III for a Colored Floor Covering and a Cement Mortar IV.1 Formulation and Production of a Colored Floor Covering (VP1)

The pigmentation of the epoxy resin dispersion EPD II for a floor covering as described in Table 1 occurs in a closed 1 liter plastic container pre-supplied with approximately ⅔ of the amount of EPD II produced and the dispersion additive DISPERBYK® 181 (solution of an alkylol ammonium salt of a polyvalent polymer with anionic/non-ionic character) and the defoamer BYK® 024 (mixture of foam destroyer polymer and polysiloxane) of BYK-Chamie GmbH and subsequent dispersion of the pigment titanium dioxide (KRONOS 2160® of Kronos Titan GmbH) and the filler BARYTMEHL (barium sulfate of Dr. R. Alberti and Co., Lauterberg) to a high rotational speed tooth disk dissolver of PENDRAULIK at roational speeds of between 500 and 8000 rpm and a tooth disk diameter of 6.5 cm over a time of 20 minutes. Subsequently the remaining amount of EPD II and water were added.

The addition of the hardening components occurs prior to use. For hardening, an amine adduct hardener on aqueous basis (BECKOPOX® VEH 2177w from Hoechst AG) is employed. This possesses an average hydrogen equivalent weight (AEW) of 170 to 180 g/eq in the linear form. Prior to the mixing with VP1, Component 1, the recipe of which is given in Table 1, the hardening agent, Component 2, is adjusted in VP 1 to 35% solids. In the formulation of the two component system described in Table 1 a stoichiometric polymerization (one equivalent of each epoxy group) is adjusted.

TABLE 1

Formation of a floor covering (VP 1)

| Raw Material/Formulation Designation | Formulation VP 1 Components 1 | |
|---|---|---|
| Amount EPD 11 | 94.11 | g |
| Amount DISPERBYK® 181 | 4.34 | g |
| Amount BYK® 024 | 2.90 | g |
| Amount TITANDIOXID KRONOS® 2160 | 28.96 | g |
| Amount Barythmehl N | 137.55 | g |
| Amount Water | 10.14 | g |
| Total Amount VP 1 Component 1 | 278.00 | g |
| Raw Material/Formulation Designation | Formulation VP 1 Components 2 | |
| Amount BECKOPOX® VEH 2177 w (35%) = Total Amount VP 1 Component 2 | 97.00 | g |
| Formulation Designation | Formulation VP 1 | |
| Total Amount VP 1 Components 1 + 2 | 375.00 | g |
| Recipe Data | | |
| Solid Bodies | 66.8 | wt. % |
| Binder Content | 21.6 | wt. % |

IV.2 Formulation and Production of a Cement Mortar (VP 2)

Table 2 shows the formulation of a cement mortar. The production of the formula VP 2 component 1, is achieved by an approximately 1 hour mixing of sand and the composition according to II.2 in a positive (paddle) mixer. Thereafter the Portland cement and the cement fluidizer are added, and this is again mixed with the positive (paddle) mixer so long, until an even distribution occurs. The mixture is free flowing and non-dust forming and remains storage stable for several months.

As hardener, component 2, there was employed an amine adduct, to which the water is added. The mixture of the hardener component is a thin fluid and storage stable for several months at between 5 and 30° C. For the hardening of the composition mixture according to II.2 in the component I of VP 2 there is for example employed an amine adduct hardener on aqueous basis (BECKOPOX® EH 623, of Hoechst AG) with an amine hydrogen equivalent weight (AEW) 185 to 215 g/eq in the delivery form.

The formulation is characterized in that the epoxy resin containing composition mixture according to II.2 contains no reactive thinner and the formulation VP 2 thus is associated with much fewer problems under conventional work environment hygienic considerations.

The utilization test results are represented under the item "utilization technical test".

TABLE 2

Formulation of a Two Component Cement Mortar

| Raw Material/Formulation Designation | Formulation VP 2 Components 1 | |
|---|---|---|
| Quartzsand F 34 (of Quarzwerke GmbH, Frechen) | 1530 | g |
| Amount of Composition Mixture according to II.2 | 34 | g |
| Portland Cement CEM I 32.5 R (of Schwenk/Mergelstetten) | 493 | g |
| Conventional Concrete Fluidizer Eg. On Basis Sulfonated Polycinylcopolymers | 11.6 | g |
| Total Amount VP 2 Component 1 | 2068.6 | g |

TABLE 2-continued

| Formulation of a Two Component Cement Mortar | |
| --- | --- |
| Raw Material/Formulation Designation | Formulation VP 2 Components 2 |
| Amount BECKOPOX ® EH 623 w | 45 g |
| Water | 208 g |
| Total Amount VP 2 Component 2 | 253 g |
| Formulation Designation | Formulation VP 2 |
| Total Amount VP 2 Component 1 + 2 Formulation VP 2 | 2321.6 g |
| Solids | 90.7 wt. % |
| Binder Agent Content of Organic Binders | 3 wt. % |
| Water/Cement Value | 0.44 |

V. Application Technical Evaluations

1. Unpigmented Formulation and Combination with Hardening Agent

For the hardening there are employed two amine adduct hardeners on aqueous basis of Hoechst AG and AKZO Chemicals GmbH, which are available under the trademarks BECKOPOX® EH 623 with an amine hydrogen equivalent weight AEW of 185 to 215 g/eq in the linear form and EPILINK® DP 700 with an amine hydrogen equivalent weight (AEW) of 250 to 350 g/eq in the linear form. For the mixing with the inventive epoxy resin dispersions or as the case may be the aqueous dispersible or water soluble composition mixtures the hardening means were adjusted to 35% solids. In the formulation of the two component systems according to Table 3 a stoichiometric polymerization (an equivalent of each epoxy group) was adjusted. The inventive epoxy resin dispersions show a very low viscosity without addition of reactive thinners or reactivation thinners or other solvents and thinners. The drying and through-hardening can, in combination with appropriate hardening means, be varied respectively according to requirements of use. Due to the non-use of reactive thinners and solvents the inventive epoxy resin dispersions and water dispersible or water soluble composition mixtures behave substantially more problem free under conditions of commercial use considerations.

The results of the tests are compiled in Table 3.

TABLE 3

| | Inventive epoxy resin dispersions and water dispersible/water soluble compositions mixtures | | | | |
| --- | --- | --- | --- | --- | --- |
| Epoxy resin dispersion or as the case may be composition mixture | EPD I** | EPD II*** | EPD III*** | EPD IV*** | Composition mixture from example 2.2 |
| Amount of epoxy resin dispersion as the case may be composition mixture | 227.26 g | 328.80 g | 339.07 g | 255.00 g | 154.75 g |
| Hardener | Beckopox ® EH 623 w | Epilink ® DP 700 | Beckopox ® EH 623 w | Epilink ® DP 700 | Beckopox ® EH 623 w |
| Amount of hardener 35% | 351.48 g | 399.00 g | 396.31 g | 305.32 g | 368.21 g |
| Amount of water | 68.18 g | — | — | — | 83.33 g |
| Drawing to tack freeness | 9–11 ours | 3–5 ours | 10–12 ours | 4–6 ours | 8–11 ours |
| Film transparency* | 5–4 | 4 | 4 | 4 | 4 |
| Pendulum recoil hardness aft. 1 d | 43 s | 108 s | 51 s | 91 s | 46 s |
| Pendulum recoil hardness aft. 4 d | 103 s | 165 s | 101 s | 157 s | 107 s |
| Pendulum recoil hardness aft. 14 d | 172 s | 177 s | 183 s | 184 s | 175 s |
| Water proofness aft. 2 d* | 4 | 54 | 54 | 54 | 4 |
| Storage stability of EPD without hardner 2 months* | 4 | 54 | 4 | 4 | Failed |

TABLE 3-continued

Inventive epoxy resin dispersions and water dispersible/water soluble compositions mixtures

| Epoxy resin dispersion or as the case may be composition mixture | EPD I** | EPD II*** | EPD III*** | EPD IV*** | Composition mixture from example 2.2 |
|---|---|---|---|---|---|
| Viscosity [mPas] EPD without hardner Brookfield 100 RPM | 285 | 45 | 60 | 73 | Failed |

*Scale: 5 = excenlt through 0 = poor
**Solids EPD I 65%
***Solids EPD II, EPD III and EPD IV 50%

2. Pigmented and Filled Formulations and Combinations with Hardeners

The testing of VP 1 occurred following mixing and applying by means of a flat spatula upon floor slabs according to Technical Testing Manual TP BE-PCC, Item 6 (1990 Edition). Subsequently it was deaereated with a spike-tooth roller.

The testing of VP 2 occurred following mixing and application upon abrasion blasted floor slabs according to TP BE-PCC, Item 6 (1990 Edition) or, alternatively, after introduction into the floor. The cement mortar is drawn off with a leveler gage and compacted and smoothed with a plastic trowel or with a wing or plate smoother with plastic plate. The coating thickness corresponded to approximately 5 to 7 mm. The further treatment occurred as conventional for follow-up treatment of mortar with moist storage of the test samples over approximately 5 days. The test results with and without prime coating, with EPD II from Table 3, are compiled in Table 4.

The use of the inventive dispersion means/emulsifier mixture permits a large variation range in the production and in the characteristics of aqueous epoxy resin dispersions. Thus for example the components of the dispersion agent/emulsifier mixture on an aromatic basis cause an increased stability, while following their combination with dispersion agent/emulsifiers on aliphatic basis, also depending from mixture ratios (A-1) and (A-2) and the employed hardening agent, the flexibility and the film forming characteristics are strongly improved.

The film forming characteristics for example of the dispersion EPD II in a dispersion agent/emulsifier-mixture ratio of the components on aromatic basis (A-1) with the components of aliphatic basis (A-2) of 1:1 and the employment or use of the amine adduct hardener BECKOPOX® EH 623 of Hoechst AG lies, in the evaluation scale 0 to 5, at 4, and the storage stability of the dispersion at 4 to 5.

As can be seen from Table 3, the epoxy resin dispersions are obtained with particularly low viscosity (viscosity of

TABLE 4

Pigmented and filled inventive epoxy resin dispersions or, as the case may be, water dispersible/water soluble composition mixtures

| Formulation | VP 1 | VP 2 |
|---|---|---|
| Storage stability 2 months* | 4 | 5–4 |
| Hardener in formulation | Beckopox ® VEH 2177 w | Beckopox ® EH 623 w |
| Drawing to tack freeness | 9–12 ours | Failed |
| Shine* | 5–4 | Failed |
| Runniness* | 4 | Failed |
| Pendulum recoil hardness aft. 1 d | 39 s | Failed |
| Pendulum recoil hardness aft. 4 d | 79 s | Failed |
| Pendulum recoil hardness aft. 14 d | 164 s | Failed |
| Water proofness 2 days after application* | 5–4 | 5–4 without prime coat 5–4 with prime coat |
| Resistance to peal 28 days after application Rub-out-test 28 days after application | 5–4 | 5–4 without prime coat 5–4 with prime coat |
| -Xylol | 5–4 | Failed |
| -Testbenzene | 5–4 | |

Scale: 5 = excelent through 0 = poor

EPD II at 50% solids 45 [mPa.s]), while the viscosities of dispersions readily available on the market lay at a factor of 5 to 100 times higher, or however require the addition of solvents or reactive thinners in order to be adjusted to a low value.

With the inventive dispersion agent/emulsifier-mixture there can be obtained, also depending upon selected dispersion processes and the solids adjustment, particularly fine particle dispersions with particle sizes of $\leq 1$ μm.

In conclusion the invention concerns: epoxy-amine adducts, obtained by reaction of (A-1) at least one or more epoxy compound(s) on the basis of multifunctional aromatic or cycloaliphatic alcohols and/or of novolac resins with an epoxy functionality >1 and $\leq 4$ and an average epoxy equivalent weight between 70 g/eq and 1000 g/eq with at least one or more with an amino group terminated polyalkyleneglycol(s) or with mixtures of the same of polyalkyleneglycol terminated with two amino groups, with an average amino functionality of 0.5 to 1.5 and an average molecular weight of 700 to 5000; ethyleneoxide contents of $\geq 60$ wt. %, based upon the total amount of polyalkyleneglycol and a ratio of the reactive equivalents of the amine terminated polyalkyleneglycol or the amine terminated polyalkyleneglycol-mixture to that of the polyepoxy or the polyepoxy-mixture of 0.01:1 to 0.9:1;

(A-2) at least one or more epoxy compound(s) on the basis of multifunctional aliphatic alcohol with an epoxy functionality >1 and $\leq 4$ and an average epoxy equivalent weight between 70 g/eq and 6000 g/eq with at least one or more amino group terminated polyalkyleneglycol(s) or with mixtures of the same with polyalkyleneglycols terminated with two amino groups with an average amino functionality of 0.5 to 1.5 and an average molecular weight of 700 to 5000; ethyleneoxide content of $\geq 60$ wt. %, based upon the total amount of polyalkyleneglycol and a ratio of the reactive equivalents of the amine terminated polyalkyleneglycol or the amine terminated polyalkyleneglycol-mixture to that of the polyepoxy or the polyepoxy-mixture of 0.01:1 to 0.9:1, wherein the mixture ratio of the one or the multi epoxy-amine adduct according to (A-1) with the one or the more of the epoxy-amine adduct according to (A-2) is between 5:95 and 95:5.

These addition products are mixed with epoxy resin in the form of polyglycidyl ethers or esters on the basis of aromatic or cycloaliphatic alcohols and of novolac resins, and dispersed in water. The obtained low viscosity dispersions are suitable for production of lacquers, paints, undercoatings, coatings and finishings.

What is claimed is:

1. Epoxy-amine adducts comprising:
   (A-1) one or more epoxy-amine adducts obtained by the reaction of:
   (i) One or more epoxy compound(s) derived from aromatic or cycloaliphatic polyols or novolac resins with an epoxy functionality of from greater than 1 to 4 and an average epoxy equivalent weight of between 70 and 1000 g/eq; and
   (ii) one or more amine-terminated polyalkylene glycol(s) selected from the group consisting of polyoxyalkylene monoamines and mixtures of polyoxyalkylene monoamines with polyoxyalkylene diamines, said amine-terminated polyalkylene glycol(s) having an average amino functionality of from 0.5 to 1.5, an average molecular weight of from 700 to 5000 and an ethyleneoxide content of at least 60% by weight based on the total amount of polyalkylene glycol(s);
   wherein the equivalent ratio of amine-terminated polyalkylene glycol(s) to epoxy compound(s) is from 0.01:1 to 0.9:1;
   (A-2) one or more epoxy-amine adducts obtained by the reaction of:
   (i) One or more epoxy compound(s) derived from aliphatic polyols with an epoxy functionality of from greater than 1 to 4 and an average epoxy equivalent weight of between 70 and 6000 g/eq; and
   (ii) one or more amine-terminated polyalkylene glycol(s) selected from the group consisting of polyoxyalkylene monoamines and mixtures of polyoxyalkylene monoamines with polyoxyalkylene diamines, said amine-terminated polyalkylene glycol(s) having an average amino functionality of from 0.5 to 1.5, an average molecular weight of from 700 to 5000 and an ethyleneoxide content of at least 60% by weight based on the total amount of polyalkylene glycol(s);
   wherein the equivalent ratio of amine-terminated polyalkylene glycol(s) to epoxy compound(s) is from 0.01:1 to 0.9:1;
   the ratio of epoxy-amine adduct(s) (A-1) to epoxy-amine adduct(s) (A-2) being between 5:95 and 95:5;
   (B-1) polyglycidyl ethers of aromatic or cycloaliphatic polyols or novolac resins with an epoxy functionality of greater than 1 to 3.5 and an average epoxy equivalent weight of between 70 and 1000 g/eq;
   (B-2) optionally, polyglycidyl esters of aromatic or cycloaliphatic polycarboxylic acids with an epoxy functionality of greater than 1 to 3.5 and an average epoxy equivalent weight of between 70 and 1000 g/eq; and
   (C) optionally, at least one member selected from the group consisting of reactive thinners, pigments, fillers and additives other than reactive thinners, pigments and fillers.

2. Epoxy resin dispersion according to claim 1, wherein, the dispersions contain epoxy resin (B-1) and optionally (B-2) with an average epoxy equivalent weight of between 100 g/eq and 550 g/eq.

3. Epoxy resin dispersions according to claim 1 wherein
   (A-1) is an adduct of a phenol-novolac epoxy resin with a mixture comprising monoamines of (ethyleneoxide/propyleneoxide)-copolymers with ethyleneoxide to propyleneoxide molar ratios of from 8.6:1.6 or 32:10 and with an average molecular weights of 1000 to 2000;
   (A-2) is an adduct of polypropyleneglycol-diglycidyl ether with a mixture comprising monoamines of (ethyleneoxide/propyleneoxide)-copolymers with ethylene oxide to propylene oxide molar relatioships of 8.6/1.6 or 32:10 and with average molecular weights of 1000 to 2000 in a mixture ratio of (A-1) to (A-2) of 1:1; and
   (B-1) a phenol-novolac polyglycidyl ether with an epoxy functionality of $\geq 1.5$ and $\leq 2.7$ and an average epoxy equivalent weight of between 150 g/eq and 300 g/eq.

4. Epoxy resin dispersions according to claim 1 wherein, the mixture of epoxy functional components (A-1), (A-2), (B-1), optionally (B-2), and, optionally the reactive thinner contains at least 2.9 wt. % chemically bound ethylene oxide, based upon the total mixture of the epoxy functional compounds, and introduced by the epoxy resin dispersion.

5. A process for the production of aqueous epoxy resin dispersions according to claim 1, wherein, water is continuously added to the mixture of (A-1), (A-2), (B-1) and optionally (B-2), with stirring and at high shear forces at a temperature of $\leq 65°$ C.

6. A lacquer, paint, coating, undercoating, finish, adhesive, sealant, film or component of cement prepared from the aqueous epoxy resin dispersion according to claim 1.

* * * * *